United States Patent
Hoenicka et al.

(10) Patent No.: US 8,833,160 B2
(45) Date of Patent: Sep. 16, 2014

(54) SENSOR IN WHICH THE SENSOR ELEMENT IS PART OF THE SENSOR HOUSING

(75) Inventors: Reinhold Hoenicka, Ortenburg (DE); Josef Nagl, Kuenzing (DE); Tobias Schopf, Bad Birnbach (DE); Heinrich Baumann, Passau (DE); Axel Seikowsky, Ortenburg (DE)

(73) Assignee: Micro-Epsilon Messtechnik GmbH & Co. KG, Ortenburg (DE)

( * ) Notice: Subject to any disclaimer, the term of this patent is extended or adjusted under 35 U.S.C. 154(b) by 43 days.

(21) Appl. No.: 13/511,081

(22) PCT Filed: Dec. 15, 2010

(86) PCT No.: PCT/DE2010/001478
§ 371 (c)(1),
(2), (4) Date: May 21, 2012

(87) PCT Pub. No.: WO2011/076181
PCT Pub. Date: Jun. 30, 2011

(65) Prior Publication Data
US 2013/0139589 A1    Jun. 6, 2013

(30) Foreign Application Priority Data
Dec. 21, 2009  (DE) .......................... 10 2009 060 002

(51) Int. Cl.
*G01D 11/24* (2006.01)
*G01L 19/14* (2006.01)
*G01P 1/02* (2006.01)
*G01D 11/30* (2006.01)
*G01D 5/00* (2006.01)

(52) U.S. Cl.
CPC .............. *G01D 11/245* (2013.01); *G01D 11/30* (2013.01); *G01D 5/00* (2013.01)
USPC ........................................... 73/431

(58) Field of Classification Search
USPC ........................................... 73/431
See application file for complete search history.

(56) References Cited

U.S. PATENT DOCUMENTS

| | | | |
|---|---|---|---|
| 4,234,289 A * | 11/1980 | Lebost ............................ | 415/4.4 |
| 4,991,283 A | 2/1991 | Johnson et al. | |
| 5,581,179 A | 12/1996 | Engel et al. | |

(Continued)

FOREIGN PATENT DOCUMENTS

| DE | 4234289 C1 * | 11/1993 |
|---|---|---|
| DE | 19620548 A1 | 12/1996 |

(Continued)

OTHER PUBLICATIONS

The International Bureau of WIPO, Patent Cooperation Treaty International Preliminary Report on Patentability for International Application No. PCT/DE2010/001478, dated Jul. 10, 2012, 6 pages, Switzerland.

(Continued)

*Primary Examiner* — Lisa Caputo
*Assistant Examiner* — Jamel Williams
(74) *Attorney, Agent, or Firm* — Alston & Bird LLP

(57) ABSTRACT

The invention relates to a sensor, comprising a sensor element (1) that operates without contact, an electronic component (5), and a housing (2) having an electrical/electronic connection. The sensor element (1) is part of the housing (2) and is used to close and seal the housing (2) with respect to the measurement side (3).

15 Claims, 5 Drawing Sheets

(56) References Cited

U.S. PATENT DOCUMENTS

| | | | |
|---|---|---|---|
| 5,691,636 A | 11/1997 | Allshouse et al. | |
| 5,974,898 A | 11/1999 | Golderer et al. | |
| 6,122,976 A | 9/2000 | Hallberg et al. | |
| 2004/0004554 A1* | 1/2004 | Srinivasan et al. | 340/870.01 |
| 2007/0157699 A1* | 7/2007 | Manlove et al. | 73/12.01 |
| 2008/0236278 A1* | 10/2008 | Theuss et al. | 73/431 |
| 2009/0015271 A1 | 1/2009 | Elliott | |
| 2009/0256560 A1* | 10/2009 | Arimura | 324/258 |
| 2009/0313797 A1* | 12/2009 | Kurtz et al. | 29/25.01 |
| 2010/0196642 A1* | 8/2010 | Langer et al. | 428/36.8 |
| 2012/0182362 A1* | 7/2012 | Odin | 347/81 |
| 2012/0299585 A1* | 11/2012 | Hoenicka et al. | 324/207.15 |
| 2013/0033256 A1* | 2/2013 | Thelemann et al. | 324/207.15 |

FOREIGN PATENT DOCUMENTS

| | | |
|---|---|---|
| DE | 10314875 A1 | 11/2004 |
| DE | 102008016829 A1 | 10/2009 |
| GB | 2314631 A | 1/1998 |
| JP | 3-188350 A | 8/1991 |
| JP | 7-083606 A | 3/1995 |
| JP | 8-327393 A | 12/1996 |
| JP | 9-196787 A | 7/1997 |
| JP | 10-500206 A | 1/1998 |
| JP | 2006-084410 A | 3/2006 |
| WO | WO03/067657 A2 | 8/2003 |
| WO | WO2011/076181 A2 | 6/2011 |

OTHER PUBLICATIONS

European Patent Office, International Search Report for International Application No. PCT/DE2010/001478, mailed Jul. 25, 2011.

European Patent Office, Written Opinion for International Application No. PCT/DE2010/001478, mailed date unknown.

* cited by examiner

SENSOR IN WHICH THE SENSOR ELEMENT IS PART OF THE SENSOR HOUSING

CROSS REFERENCE TO RELATED APPLICATIONS

This application is a national stage application, filed under 35 U.S.C. §371, of International Application No. PCT/DE2010/001478, filed Dec. 15, 2010, which claims priority to German Application No. 10 2009 060 002.7, filed Dec. 21, 2009, both of which are hereby incorporated by reference in their entirety.

BACKGROUND

1. Technical Field

The invention relates to a sensor having a sensor element operating without contact and a housing comprising electronic components as well as an electric connection.

The sensor discussed here represents a sensor operating without contact, with the concretely realized principle being of minor importance. In general it may represent any sensor operating without contact, for example a pressure sensor, an optic sensor, a temperature sensor, a capacitive or inductive sensor, etc. Sensors of the type in question here are used in the most various applications in order to detect physical parameters. In many applications the sensor is subjected to quite considerable environmental influences, such as dirt, dust, water, oil, or other media, which may falsify the measurements or can even destroy the sensor. Excess pressure or vacuum as well as temperature may also lead to an adverse effect or even destruction of the sensor. Accordingly, in such applications it is always necessary to protect the sensor from exterior influences by rendering the housing tightly closed, frequently even hermetically sealed.

2. Description of Related Art

In particular applications it may be necessary to protect the environment from disturbing influences from the sensor. This is particularly the case in a high vacuum or in ultra-clean environments. The environment might be compromised by the emission of contaminating substances from the sensor. For example, when used in an ultra-high vacuum any evaporation of disturbing substances must be prevented because they might destroy the vacuum. In ultra-clean environments, the sensor may not emit any disturbing substances, either. This is the case, for example, in the semiconductor production, in which the environment for the production process must be extremely clean. Particles or gases might interfere with the process by compromising or even destroying reticules, substrates, or optical devices, such as mirrors or lenses. Therefore, under such environmental conditions it is mandatory that no disturbing substances separate from the sensor to the outside.

In order to seal the sensor housing numerous options are known in practice. For example it is possible to use a multi-part housing, with its parts being connected to each other mechanically, for example by a screw connection, clamping, riveting, etc. For sealing purposes, commonly sealing elements made from rubber or plastic are used. Additionally, adhesion or molding methods are known in practice, which are generally used in sensor technology. Here, an adhesion or molding means connects the housing parts to each other and/or to the sensor element. Ultimately the molding material fixates the sensor element inside the housing.

Another option for sealing is given by way of soldering or welding. Here, commonly identical or similar materials, particularly metals, are connected to each other. Additionally, metal-ceramic soldering connections are known from prior art.

The above-stated sealing measures known in practice are disadvantageous such that the sensor element is embodied as a separate component inside the housing, more or less encased by the housing parts. In many types of sensors the measurement is falsified by the housing, in spite of an extremely thin embodiment of the housing wall. For example, in an optic sensor the measurement occurs through a glass window, which for sealing purposes is adhered to the housing. By absorption or diffraction, particularly at the adhesion points, the risk develops that the measurement is influenced. In magnetic sensors the measuring signal is influenced by ferromagnetic materials. In case of inductive or eddy current sensors a metal housing energizes the electromagnetic fields resulting in a reduced measuring signal. For reasons of the required robustness and mechanic stability of the sensor particularly in industrial applications it is usually necessary to produce the housing from metal, regularly from low-cost steel. In order to prevent the housing from excessively influencing the measuring signal the sensor is usually covered and/or sealed at the face with a cap made from plastic, ceramic, or another non-conducting material. The connection of the cap to the metal housing can here occur by way of adhesion, clamping, or using sealing rings, particularly in case of ceramic caps also by way of soldering.

In the sensors of prior art and the methods used for their production it is disadvantageous, though, that the actual sensor element, for example the copper coils of an inductively operating sensor or the condenser plates of a capacitive sensor are further apart and/or separated by the housing from the location of the measurement. This leads to a reduction of sensitivity of the sensor, namely due to the influence of the housing.

In particular in case of distance sensors the measuring distance of the sensor element from the measured object increases due to the housing and/or the material thickness of the housing, because the wall thickness and perhaps existing distances increase the actual measuring distance due to the concrete embodiment of the housing or due to necessary air or adhesion gaps. Additionally, the necessity of a suitable encasing and/or covering via a housing cap leads to additional costs, namely on the one hand material costs and on the other hand costs for assembly.

Sensors with plastic housings are already known in practice, which can be produced more cost-effectively than metal housings. However, plastic housings are disadvantageous in that they absorb moisture/water from the environment, particularly also moisture from the air. This way, capacitive sensors and eddy current sensors are compromised in their function, because due to the accepted water the capacity of the sensor arrangement is changed and regularly a drift of the measurement is caused.

BRIEF SUMMARY

In light of the above-stated explanations the invention is based on the objective to provide a sensor with a sensor element operating without contact, with its housing being sufficiently well encased without here shielding the sensor element in any disadvantageous manner. Additionally it shall be possible to produce the sensor in a cost-effective fashion.

The above-stated objective is attained by the features of claim 1. Accordingly the generic sensor is characterized in the sensor element being a part of the housing and said housing is closed or sealed towards the measuring side.

According to the invention it was deviated from the technology of prior art in which the sensor housing has been closed by a cap or the like towards the measuring side. Rather a new technology has been realized, according to which the actual sensor element is placed directly at the measuring side of the sensor and/or forms it, namely such that the sensor element itself serves as the cover of the housing, thus the sensor element represents a part of said housing and closing it towards the measuring side and thus simultaneously seals it.

According to the above-stated explanations it is required according to the invention that the sensor element, being a structural unit, is suitable to cover the housing. In other words, the sensor element forms the cover of the housing and therefore itself serves, in addition to the actual measuring and/or detection function, also in a sealing and/or encasing function.

Consequently the sensor element represents a part of the housing and by the tight connection to the housing forms a unit.

In fact it is possible that the housing, as previously common and advantageous, is made from metal. The sensor element could be made from ceramics at least at its surface. The functional elements of the sensor element could here be integrated in an appropriately defined ceramic substrate.

In order to avoid thermal tensions and the formation of cracks resulting therefrom, particularly at the connection sites, it is additionally advantageous for the thermal expansion coefficients of the housing and the sensor element to be approximately adjusted to each other. Here, metals for the housing and ceramics for the sensor element can be found easily, with their expansion coefficients being approximately identical.

In fact, it is possible that the sensor element is placed onto the housing at the measuring side, preferably flush, and is here glued, soldered, or welded to the housing. In a flush embodiment of the sensor element this would mean that it extends said housing towards the measuring side, at least slightly, however here the housing and thus the interior of the housing is hermetically sealed.

It is also possible that the sensor element is inserted into the housing with custom-fit and/or in a form-fitting fashion and here defines the cover of the housing at the measuring side. Within the scope of such an embodiment the housing wall would accept the entire sensor element, with the sensor element forming the facial cover of the housing without the sensor element being additionally shielded.

As already mentioned, the sensor element may be connected to the housing in any arbitrary fashion, with a sealing connection being advantageous. The sensor element could be adhered, soldered, or welded to the housing. It is also possible that the sensor element is inserted into a heated housing and the sensor housing during the cooling process regularly shrinks onto the sensor element so that a force-fitting connection is created, perhaps with adhesion means interposed.

The sensor element may also be produced from ceramics and/or a ceramic substrate, with the functionality of the sensor element potentially being defined by a multi-layered ceramic. In a particularly advantageous fashion the sensor element is produced in LTCC technology (low-temperature cofired ceramics). Here, the following explanations:

Using LTCC technology so-called low temperature cofired ceramics are produced. This represents a technology by which in prior art multi-layered circuits have been produced based on sintered ceramic substrates. Circuit board tracks, condensers, resistors, and coils can be produced. The elements can be applied on the layers by way of serigraphy or photo-technical processes. The green ceramic films are structured individually, namely with the function elements of the respective sensors, subsequently stacked, and laminated. Finally a defined sintering profile is applied with a sinter temperature adjusted to the ceramic material, usually ranging from approximately 850 to 900° C.

In any case it is particularly advantageous to produce the sensor element in LTCC technology as a multi-layered ceramic substrate, which includes the electric/electronic components of the respective sensor and the contacts and/or connections. This way, the sensor element in the LTCC technology shall be understood as a monolithic element, which is overwhelmingly made from ceramics. A sensor element produced and/or sintered this way can be used ideally for the closing of the metal housing, namely because it shows sufficiently good pressure resistance, without the actual sensor element being shielded from the outside by a separate protective cover. To the contrary, the sensor element is exposed at the measuring side so that the problems arising in practice, to the extent known from prior art, are largely eliminated.

The advantages according to the invention can be briefly summarized as follows:

The sensor element is located very far at the front and thus close to the measured object without the provision of any separating parts, air gaps, molding gaps, etc. This leads to higher sensitivity;

By the higher sensitivity of the sensor element the resolution and stability of the sensor is also increased because a lower amplification of the signal can be selected;

By the low distance the required measuring spot is smaller, allowing even smaller measuring objects to be measured and/or detected with constant linearity;

The sensor element is a part of the housing, resulting in savings for the housing with regards to the otherwise common cover;

By the option of a soldering connection the sensor element is connected to the housing in a sealed fashion. Foreign objects are effectively prevented from entering the interior of the sensor;

The sensor is hermetically sealed and suitable for pressure and vacuum applications without any additional sealing measures;

The emission or release of volatile substances from the interior of the sensor into a vacuum or ultra-clean environment is effectively prevented;

An integrated electronic at the rear of the sensor element allows shorter wiring lengths and lower parasitic capacities, which increases the stability (endurance stability, EMV-stability, temperature stability) and sensitivity of the sensor;

The use of a ceramic substrate offers high mechanic robustness and stability of the sensor element. Particularly the temperature stability is high due to the low expansion coefficient of ceramics, allowing temperature-stable and long-lasting sensors to be realized;

The absorption of water into ceramic is negligible so that no influencing occurs by changed parasitic capacities;

A direct temperature measurement is possible on the ceramic in the immediate proximity of the measuring coil or the measuring capacity, thus temperature gradients are of no influence, here. The temperature compensation occurs directly at the location of the measurement, namely immediately at the measuring side of the sensor.

BRIEF DESCRIPTION OF THE FIGURES

There are various options to advantageously embody and further develop the teaching of the present invention. For this purpose, on the one hand reference is made to the claims dependent on claim 1 and on the other hand to the following explanation of preferred exemplary embodiments of the invention based on the drawing. Generally preferred embodiments and further developments of the teaching are further explained in connection with the explanation of preferred exemplary embodiments of the invention using the drawing. The drawing shows:

DETAILED DESCRIPTION

Figure 1:
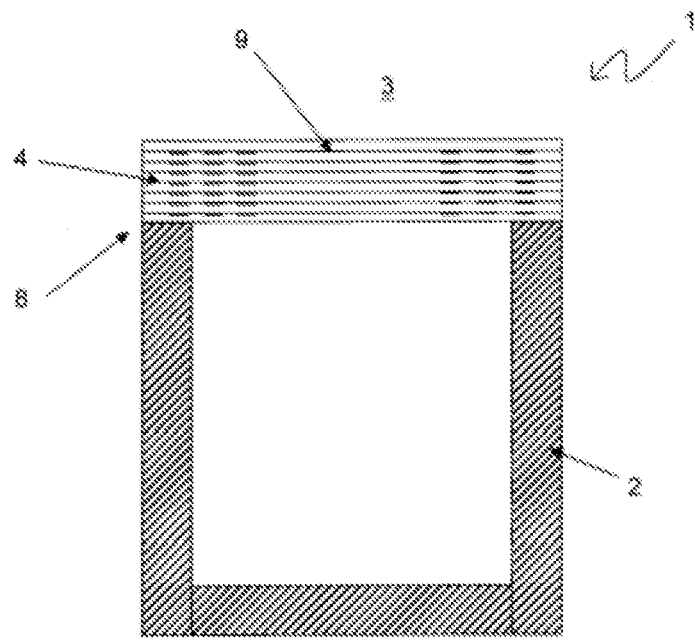
FIG. 1 in a schematic side view, cross-sectioned, the general design of a sensor according to the invention, in which the sensor element made in LTCC technology comprises a ceramic substrate and operates according to the eddy current principle, FIG. 2 in a schematic side view, cross-sectioned, another exemplary embodiment of a sensor according to the invention, in which the sensor element made in LTCC technology comprises a ceramic substrate and operates according to the eddy current principle and with electronic components being arranged at the rear of the sensor element, FIG. 3 in a schematic side view, cross-sectioned, another exemplary embodiment of a sensor according to the invention, in which the sensor element made in LTCC technology comprises a ceramic substrate and operates according to the eddy current principle as well as capacitively and with electronic components being arranged at the rear of the sensor element, FIG. 4 in a schematic side view, cross-sectioned, another exemplary embodiment of a sensor according to the invention, in which the sensor element made in LTCC technology comprises a ceramic substrate and is embodied as a pressure sensor and with electronic components being arranged at the rear of the sensor element, and FIG. 5 in a schematic side view, cross-sectioned, another exemplary embodiment of a sensor according to the invention, using the multi-layer LTCC technology with integral through connection.

FIG. 1 shows in a highly schematic view, cross-sectioned, an exemplary embodiment of a sensor according to the invention, in which it here may represent an inductive or a capacitive sensor. The sensor element 1 is discernibly a part of the housing 2 and seals the housing 2 towards the measuring side 3 in a hermetic fashion.

In fact, the sensor element 1 represents a multi-layer ceramic 9, which has been produced in LTCC technology (low-temperature cofired ceramics). The actual sensor element 1 is here coil 4 integrated in the multi-layered ceramic 9, embedded in several layers of the ceramic substrate 9.

In a capacitive sensor this would represent a conductive planar electrode, which is a part of the condenser developing between the electrode and the measuring object. The sensor element is here also a ceramic substrate, which comprises several layers, with the layers being connected to each other in a sintering process, namely by way of diffusion. During sintering a compact, stable, and easily handled unit develops.

The sensor element 1 shown in FIG. 1 is soldered to the housing 2, comprising metal, thus forming a compact, fixed connected unit. The housing 2 is hermetically sealed by the sensor element 1. The soldering connection 8 is indicated.

Here it shall be mentioned that in the illustration of FIG. 1 the electric connections have been waived, since FIG. 1 only shows the principal design in reference to the housing 2 and the covering sensor element 1.

Figure 2:
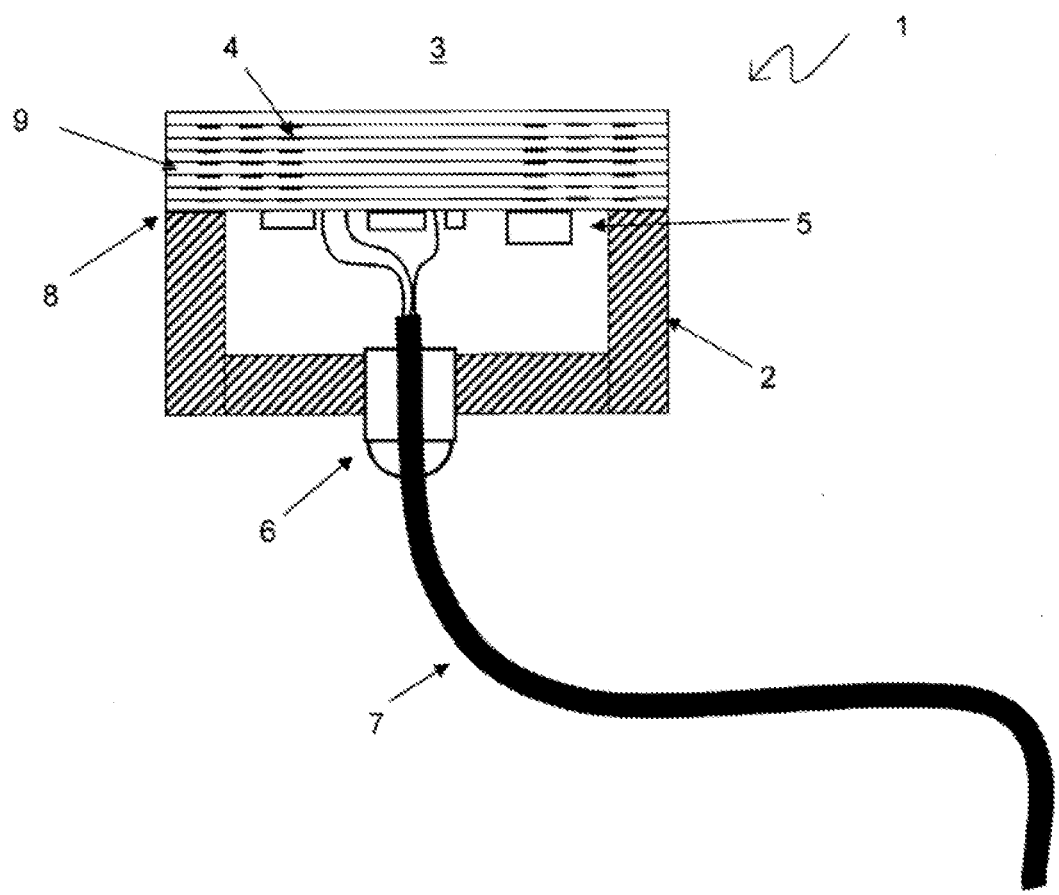

FIG. 2 shows a further development of the sensor according to the invention, with here the sensor element 1 being equipped with the electronic components 5 at the rear, i.e. at the interior side in the housing 2. The sensor element 1 shown in FIG. 2 also represents a sensor element 1 operating according to the eddy current principle.

The provision with electronic components 5 can occur according to the hybrid technology known per se.

FIG. 2 further shows the provision of a sealing cable conduit 6 with the connection cable 7 extending through it to the sensor element 1 to which the wires of the connection cable 7 are coupled and/or electrically connected.

Furthermore, the sealing soldering connection 8 between the housing 2 and the sensor element is indicated in FIG. 2. A secure sealing is created by said soldering connection. Additionally the sensor element 1, which is made from a ceramic substrate, is sufficiently resistant.

Figure 3:
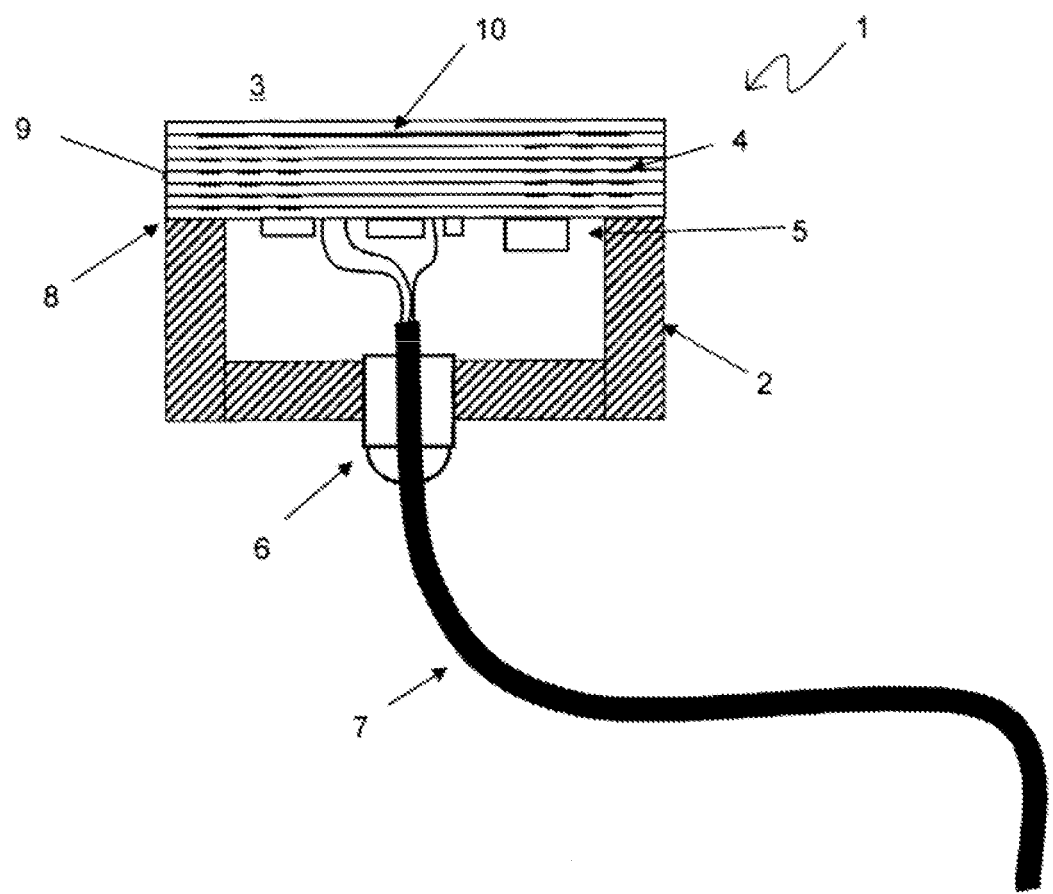

FIG. 3 shows an exemplary embodiment of a sensor according to the invention with here two differently operating sensor elements 1 being arranged and/or integrated on the ceramic substrate 9. In addition to the coil 4 for the eddy current sensor simultaneously an electrode 10 is integrated for the capacitive sensor. This way a combination sensor is formed which may be additionally provided with another temperature sensor. For example, the Ohm-resistance of the coil wire could be used in a manner known per se for temperature measurement and thus for temperature compensation of an inductively operating sensor element. It is particularly advantageous for the measuring coil and the compensation coil to be inserted into the ceramic substrate 9 separated from each other. Here, the respective features of the coil can be optimally adjusted to the purpose (distance measurement and temperature compensation).

Figure 4:
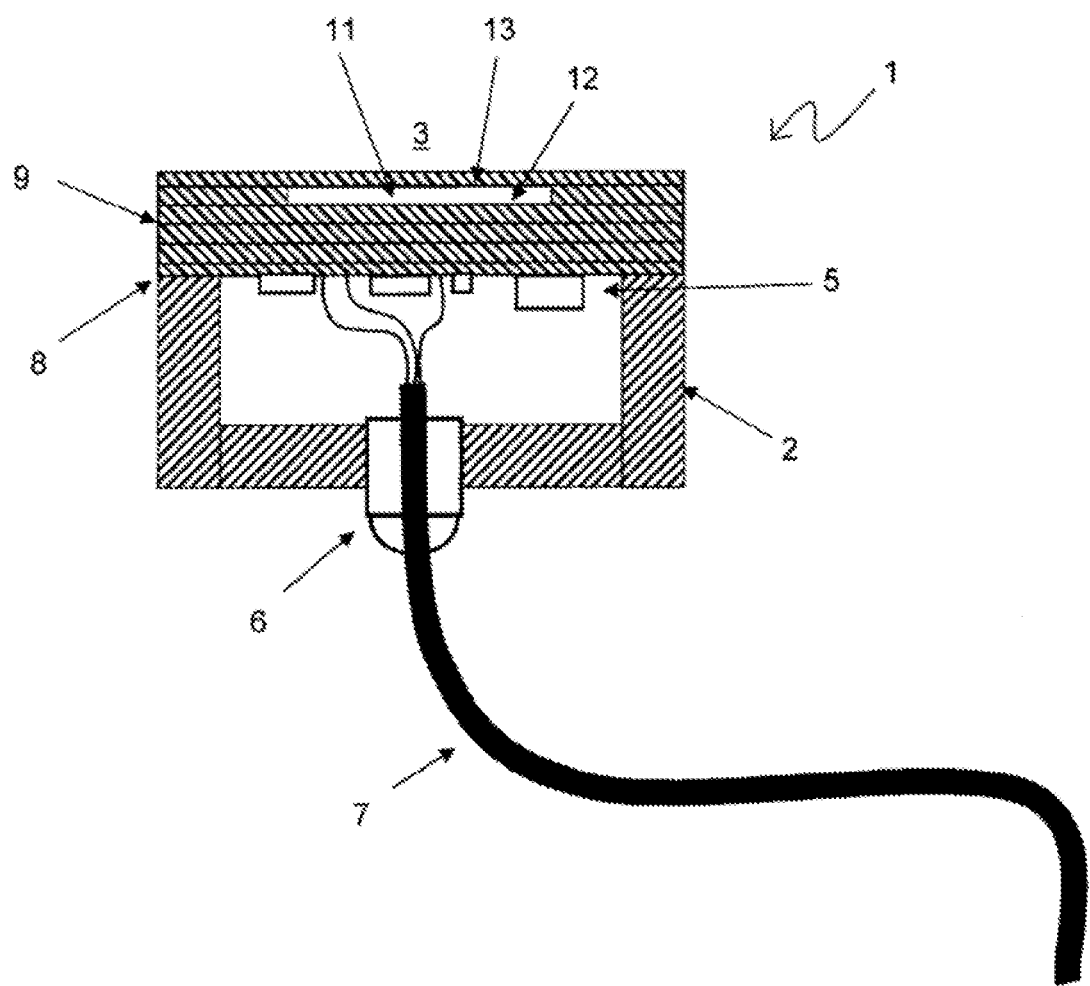

FIG. 4 shows a sensor in which the sensor element 1 is embodied as a pressure sensor, namely also according to the LTCC technology. Here, too, the ceramic substrate 9 comprises several layers, which jointly cover and seal the housing 2, embodied as a metal housing, via a soldering connection 8.

Here, too, electronic components 5 are provided at the rear of the element 1 and/or the ceramic substrate 9.

In the illustration according to FIG. 4, a connection cable 7 also extends through a cable conduit 6 into the interior of the housing 2 and is here coupled and/or electrically connected to the rear of the sensor element 1.

In FIG. 4 it is also discernible that a pressure sensitive element 11 is directly encased as a hollow space 12 in the ceramic substrate 9. The front of the ceramic substrate 9 forms the pressure sensitive membrane 13, which is deflected when impinged with pressure. In order to measure the distance change of the pressure sensitive membrane 13 once more capacitive electrodes of eddy current coils may be used inside the ceramic substrate 9.

The combination of the above-discussed sensor element 1 made from LTCC-ceramic with a housing 2 made from titanium, zirconium, or an alloy therefrom is particularly advantageous. Titanium or zirconium and ceramic show almost identical thermal expansion coefficients so that in a connection between the materials no disturbing tensions develop at the connection site during temperature changes. For soft soldering a pretreatment of the ceramic substrate is required, for example by metalizing and perhaps gilding, the metal housing at the soldering site. Titanium can be soldered to ceramics particularly well due to its material characteristics, in particular due to the specific surface energy/surface tension. During the so-called active brazing, titanium and ceramic can be connected to each other directly without here prior to the soldering connection the need for any intermediate layers to be applied as adhesive additives.

It is also possible to embody the metal housing in several parts, for example comprising a metal frame and a housing lid. In the multi-stage process the metal frame for example comprising titanium or zirconium may be soldered onto the sensor element via hard soldering. Due to the fact that hard soldering occurs at relatively high temperatures of approx. 850° C. the following soldering processes can be performed via soft soldering, without the hard soldering connection being released. This way, electronic components can be soldered onto the sensor element after the soldering of the metal frame onto the sensor element. The housing lid is connected to the metal frame after the electronic elements have been applied. This may for example also occur by way of soldering, welding, or adhesion.

The use of multi-layered LTCC technology is particularly advantageous, because here circuit board tracks and thus through connections can be produced. The contacting of electronic components in the pressure chamber of the vacuum area is frequently a problem when cables, wires, or lines must be used. Guiding wires out of these areas is problematic, because expensive and complicated vacuum conduits are required. They are frequently insulated with glass and therefore complicated and expensive in their production as well as application.

Figure 5:
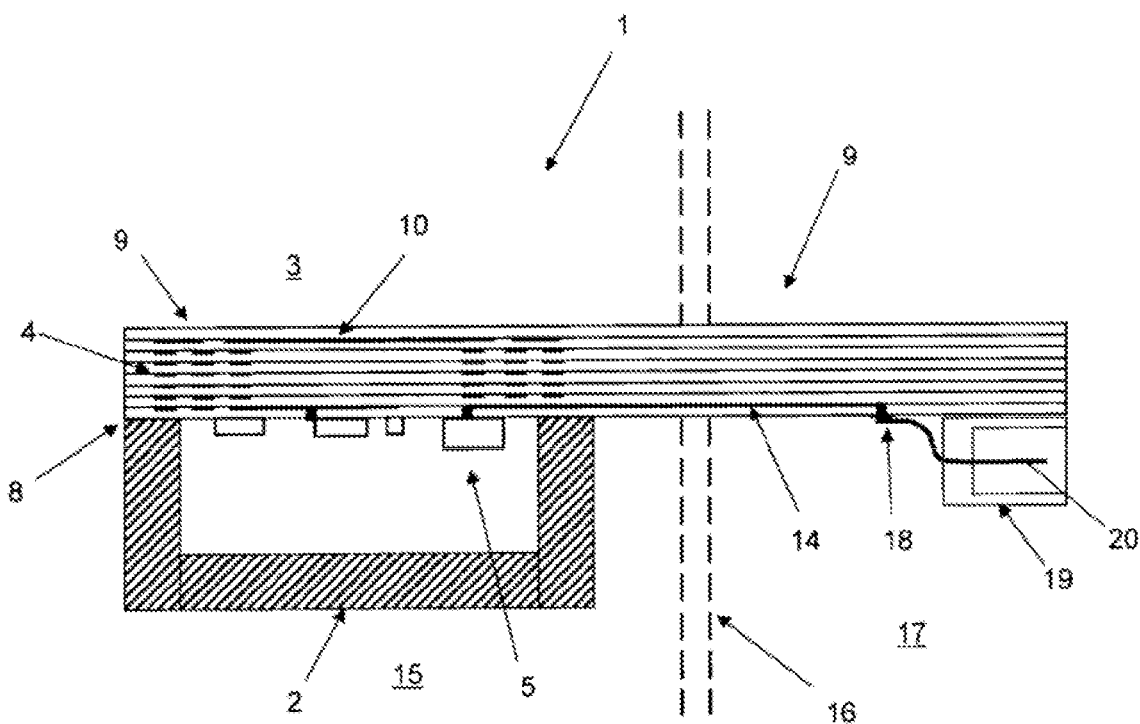

According to the illustration in FIG. 5 the circuit board tracks 4, 14 inside the ceramic 9 under the metal housing 2 can be guided out of the pressure chamber or the vacuum area 15 in the sensor elements 1 according to the invention. By the sintered connection inside the ceramic 9 the circuit board tracks 4, 14 are hermetically sealed so that the sealing of the housing 2 is not compromised. No additional vacuum or pressure conduits are required for the connection lines so that a simple, cost-effective, and additionally very compact passage can also be realized. This way, hermetically sealed and mechanically stable connections can be produced for the electronic in a simple fashion.

At the side 17 facing away from the pressure and/or vacuum the circuit board tracks 14 are guided out of the ceramic substrate 9 via a through connection 18. At the point of the through connection 18 a soldering pad may be applied, onto which then a plug 19 or a connection cable 20 is soldered by a conventional soldering technique. Due to the fact that this side of the ceramic 9 is located outside the pressure chamber 15 and/or the vacuum here a beneficial, simple plug 19 can be used, not required to withstand high pressures or a vacuum.

With regards to additional advantageous embodiments of the sensor according to the invention and in order to avoid repetitions reference is made to the general part of the description as well as the attached claims.

Finally, it shall explicitly be pointed out that the above-described exemplary embodiments of the sensor according to the invention serve only to explain the claimed teaching, however they are not limited to the exemplary embodiments.

LIST OF REFERENCE CHARACTERS 1 sensor element
2 housing, metal housing
3 measuring side of the sensor
4 coil/circuit board track
5 electric components
6 cable conduit
7 connection cable
8 soldering connection
9 ceramic, ceramic substrate, multi-layer ceramic
10 electrode
11 pressure-sensitive element
12 hollow chamber
13 pressure-sensitive membrane
14 conduit (for passage)
15 pressure chamber, vacuum area
16 boundaries to high pressure, vacuum
17 side facing away from the pressure/vacuum
18 through connection, soldering pad
19 plug
20 connection cable (in the plug or instead of the plug)

The invention claimed is:

1. A sensor with a sensor element (1) operating without contact and a housing (2) comprising electronic components (5) as well as an electric/electronic connection, wherein the sensor element (1) represents a part of the housing (2), comprises a multi-layered ceramic, and closes and seals the housing towards the measuring side (3) of the sensor element (1).

2. A sensor according to claim 1, wherein the housing (2) is selected from a group consisting of titanium or zirconium or a respective alloy.

3. A sensor according to claim 1, wherein the thermal expansion coefficients of the housing (2) and the sensor elements (1) are approximately adjusted to each other.

4. A sensor according to claim 1, wherein the sensor element (1) at the measuring side is at least one of placed onto the housing (2) and inserted into the housing (2).

5. A sensor according to claim 4, wherein the sensor element (1) at the measuring side is placed onto the housing (2) in a flush fashion.

6. A sensor according to claim 4, wherein the sensor element (1) at the measuring side is inserted into the housing (2) in a custom fit.

7. A sensor according to claim 4, wherein the sensor element (1) at the measuring side is inserted into the housing (2) in a form fitting fashion.

8. A sensor according to claim 1, wherein the sensor element (1) is at least one of glued, soldered, and welded to the housing (2).

9. A sensor according to claim 1, wherein the sensor element (1) is equipped at the rear side, i.e. the side facing away from the measuring side (3) with electronic components (5), preferably in a hybrid technology.

10. A sensor according to claim 1, wherein the sensor element (1) is formed by LTCC technology (low temperature cofired ceramics).

11. A sensor according to claim 1, wherein two or more sensor elements (1) are at least one of integrated in a ceramic substrate (9) or configured for combining in a ceramic substrate (9).

12. A sensor according to claim 11, wherein the two or more sensor elements (1) are functionally connected to each other.

13. A sensor according to claim 1, wherein the sensor element (1) represents an integral part of the housing (2).

14. A sensor according to claim 1, wherein the housing (2) is made from metal.

15. A sensor according to claim 1, wherein the multi-layered ceramic defines, at least in part, a surface layer of the sensor element (1).

* * * * *